(12) United States Patent
Jasti et al.

(10) Patent No.: US 7,119,948 B2
(45) Date of Patent: *Oct. 10, 2006

(54) OPTICAL AMPLIFIER APPARATUS AND METHOD

(75) Inventors: Chandra Sekhar Jasti, Cupertino, CA (US); Hermann Gysel, Cambria, CA (US); Mani Ramachandran, San Jose, CA (US)

(73) Assignee: General Instrument Corporation, Horsham, PA (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/249,250

(22) Filed: Oct. 13, 2005

(65) Prior Publication Data

US 2006/0056012 A1    Mar. 16, 2006

(51) Int. Cl.
*H01S 3/00* (2006.01)
(52) U.S. Cl. .................... 359/341.1; 359/349
(58) Field of Classification Search ............. 359/349, 359/341.1
See application file for complete search history.

(56) References Cited

U.S. PATENT DOCUMENTS

| | | | |
|---|---|---|---|
| 6,480,327 B1 | 11/2002 | Betin | 359/338 |
| 6,483,636 B1 | 11/2002 | Sugaya et al. | 359/349 |
| 6,654,513 B1 | 11/2003 | Liden et al. | 385/24 |
| 6,882,781 B1 | 4/2005 | Ionov | 385/48 |
| 6,980,357 B1 * | 12/2005 | Jasti et al. | 359/349 |

\* cited by examiner

*Primary Examiner*—Mark Hellner
(74) *Attorney, Agent, or Firm*—Lawrence Y. Cullen

(57) ABSTRACT

An optical amplifier (200) splits an optical signal into two signals (210, 212). A first amplifier section (202) receives the first signal (210). The first amplifier section (202) includes a first optical fiber (220), having a first input, for generating a first output power (230), and a first pump source (222) is coupled to the first input, for supplying a first energy amount to the first optical fiber (220). The optical amplifier (200) also includes a second amplifier section (204) to receive the second signal (212), which is arranged in parallel to, and under common control with, the first amplifier section (202). The second amplifier section (204) includes a second optical fiber (240), having a second input, for generating a second output power (250), and a second pump source (232) is coupled to the second input, for supplying a second energy amount to the second optical fiber (240). A total power (280) of the first output power (230) and the second output power (250) is at least about 600 milli Watts.

28 Claims, 3 Drawing Sheets

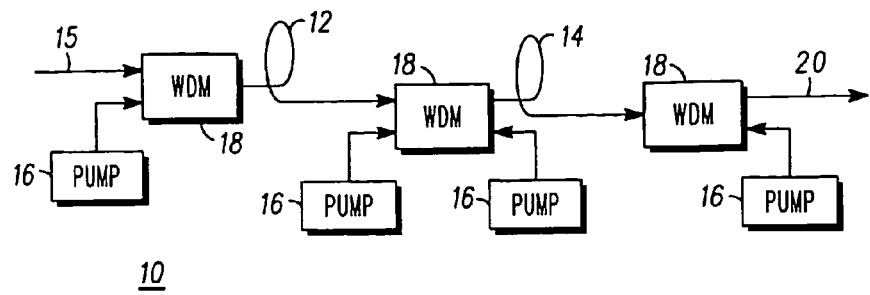
FIG. 1
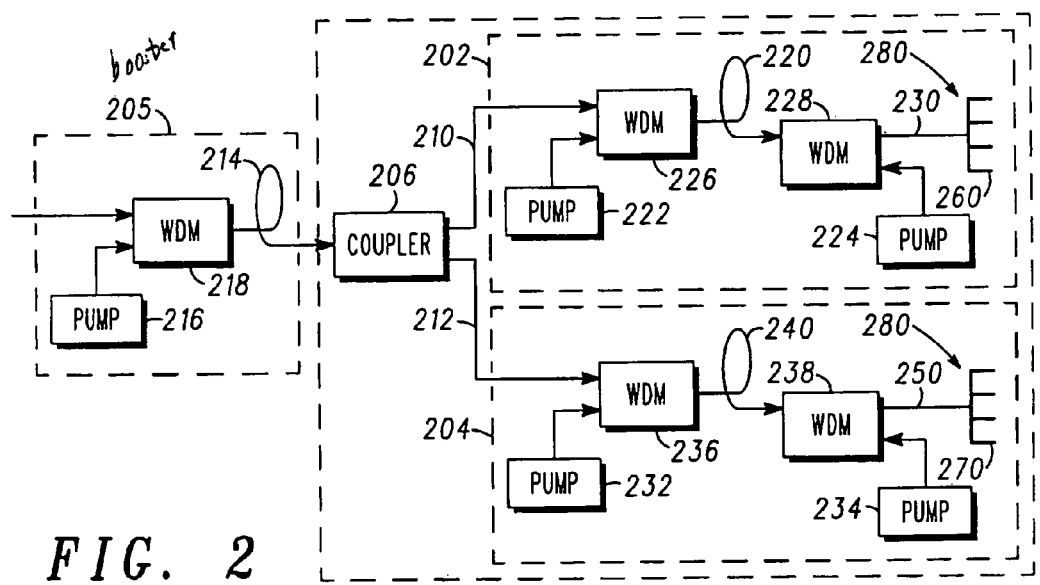
FIG. 2
FIG. 3
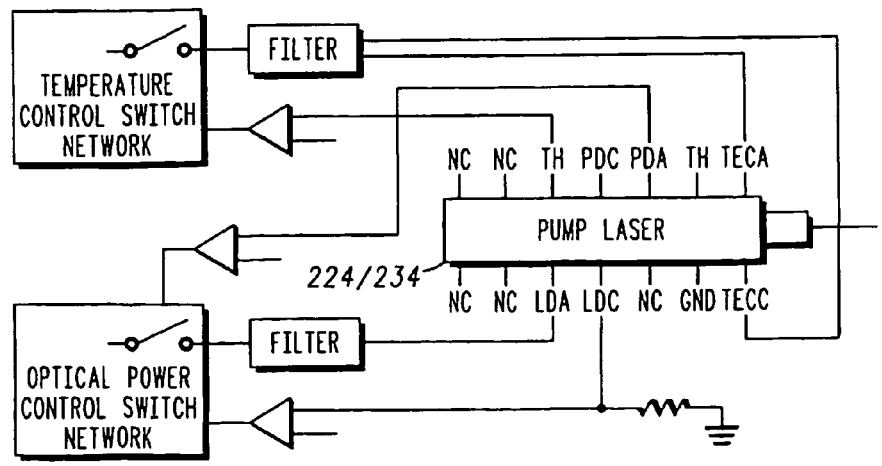

OPTICAL AMPLIFIER APPARATUS AND METHOD

BACKGROUND OF THE INVENTION

1. Field

Aspects of this invention relate generally to optical fiber communication, and, more specifically, to an optical amplifier and to a method for amplifying an optical input signal.

2. Description of Relate Art

Optical amplifiers, such as rare earth doped fiber amplifiers, are frequently found in fiber-optic communication systems and networks. The cable television industry, for example, provides communication of information (for example, audio, video, multimedia, and data) between a headend and a plurality of consumer devices at least in part via a fiber-optic network—the headend typically transmits information in an optical format, using one or more fiber optic links, and consumer devices may also generate information that may be converted into an optical format for transmission to the headend.

Passive optical networks ("PONs") are increasingly being used to deliver cable communication services to consumers at affordable prices. A PON architecture is one in which active components are located either centrally (for example, at the headend), or locally (for example, at consumer locations), while passive components are disposed in between. Single optical amplifiers capable of delivering power in a range of about 600 mill Watts ("mW") to 3 Watts, which can each serve several-hundred customer locations, are desirable to overcome losses of passive components in a PON.

Optical amplifiers that generate suitable powers, however, are often difficult to reliably achieve using conventional rare earth doped fiber technologies. A conventional erbium-doped fiber amplifier architecture 10 is shown in FIG. 1. Amplifier architecture 10 features two stages of erbium-doped fibers 12, 14. To provide gain to erbium-doped fibers 12, 14, fibers 12, 14 are pumped optically by pumps 16. Pumps 16 are coupled to wave division multiplexers 18. Erbium-doped fibers 12, 14 and wave division multiplexers 18, however, are often unable to handle higher pump powers, restricting an efficient output power 20 of amplifier architecture 10 to about 500 mW. In addition, as output power 20 increases, the optical components of amplifier architecture 10 should be qualified for high power, increasing the cost and reliability of the amplifier. Further, failure of any particular pump in amplifier architecture 10 may lower output power 20, which in turn may lower the power in an entire downstream network, affecting multiple consumers. Still further, having a number of pumps and fibers in a serial configuration may cause the amplified wavelength range to shift to longer wavelengths, for example, 1560 nanometers, which may be undesirable in many applications.

The use of cladding pumped technology, in which an ytterbium fiber laser (915 or 975 nanometer pump) is used for pumping in an erbium-ytterbium amplifier, may be suitable for some applications. Cladding pumped technology alone, however, is not currently as developed or reliable as conventional erbium-doped fiber technology, and also requires the use of special pumps and components, increasing amplifier cost. Moreover, a single component having the serial architecture illustrated in FIG. 1 may still not reliably generate up to 3 Watts of output power.

There is therefore a need for a reliable, low-cost, easily configurable, single-component optical amplifier capable of producing at least about 600 mW—and in some variations up to 3 Watts—of output power.

SUMMARY

According to an aspect of the present invention, an optical amplifier for amplifying an optical input signal includes a first optical coupler, for splitting the optical input signal into a first optical signal and a second optical signal. A first amplifier section is responsive to receive the first optical signal. The first amplifier section includes a first rare earth doped optical fiber for generating a first optical output power, a first pump source, and a second pump source. The first and second pump sources are for supplying a first energy amount, in a common wavelength band, to the first rare earth doped optical fiber. The optical amplifier also includes a second amplifier section responsive to receive the second optical signal, which is arranged in parallel to, and under common control with, the first amplifier section. The second amplifier section includes a second rare earth doped optical fiber for generating a second optical output power, a third pump source, and a fourth pump source. The third and fourth pump sources are for supplying a second energy amount, in the common wavelength band, to the second rare earth doped optical fiber. A total power of the first optical output power and the second optical output power is at least about 600 mill Watts.

The common wavelength band may be between about 1540–1570 nm. Both the first and second rare earth doped optical fibers may be doped with erbium, or a combination of erbium and ytterbium. The pump sources may be single-mode or multi-mode pumps, and may have switched temperature or optical power control. The first pump source may be arranged in such a manner to supply energy to the first erbium doped optical fiber in a forward direction relative to the first optical signal, and the second pump source may be arranged in such a manner to supply energy to the first erbium doped optical fiber in a reverse direction relative to the first optical signal. Likewise, the third pump source may be arranged in such a manner to supply energy to the second erbium doped optical fiber in a forward direction relative to the second optical signal, and the fourth pump source may be arranged in such a manner to supply energy to the second erbium doped optical fiber in a reverse direction relative to the second optical signal.

The optical amplifier may further include at least one wave division multiplexer ("WDM") disposed in the first amplifier section, responsive to supply the first energy amount to the first rare earth doped fiber; and at least one WDM disposed in the second amplifier section, responsive to supply the second energy amount to the second rare earth doped fiber. Also, a first optical coupler, for splitting the first optical output power into a first plurality of output signals (for example, four), and a second optical coupler, for splitting the second optical output power into a second plurality of output signals (for example, four), may be provided. In addition, to increase the total power to a range between about 600 mill Watts to 900 mill Watts (or to at least about 1 Watt, using erbium/ytterbium-doped fibers, multi-mode pumps, power combiners, and/or high-power isolators), the optical input may be generated by a third rare earth doped optical fiber, and a fifth pump source, may supply energy to the third rare earth doped optical fiber.

In accordance with another aspect of the present invention, an optical amplifier for amplifying an optical input signal includes a first optical coupler, for splitting the optical input signal into a first optical signal and a second optical signal. A first amplifier section is responsive to receive the first optical signal. The first amplifier section includes a first rare earth doped optical fiber, having a first input, for generating a first optical output power, and a first pump source coupled to the first input, for supplying a first energy amount to the first rare earth doped optical fiber. The optical amplifier also includes a second amplifier section responsive to receive the second optical signal, which is arranged in parallel to, and under common control with, the first amplifier section. The second amplifier section includes a second rare earth doped optical fiber, having a second input, for generating a second optical output power, and a second pump source coupled to the second input, for supplying a second energy amount to the second rare earth doped optical fiber. A total power of the first optical output power and the second optical output power is at least about 600 mill Watts.

In accordance with a further aspect of the present invention, a method for amplifying an optical input signal includes: splitting the optical input signal into a first optical signal and a second optical signal; receiving the first optical signal at a first amplifier section, the first amplifier section having a first rare earth doped optical fiber for generating a first optical output power; supplying a first energy amount to the first rare earth doped optical fiber via a first pump source and a second pump source, the first and second pump sources operating in a common wavelength band; receiving the second optical signal at a second amplifier section, the second amplifier section arranged in parallel to, and under common control with, the first amplifier section, the second amplifier having a second rare earth doped optical fiber for generating a second optical output power; and supplying a second energy amount to the second rare earth doped optical fiber via a third pump source and a fourth pump source operating in the common wavelength band. A total power of the first optical output power and the second optical output power is at least about 600 mill Watts.

BRIEF DESCRIPTION OF THE DRAWINGS

FIG. 1 illustrates a conventional erbium-doped amplifier architecture.

FIG. 2 illustrates an optical amplifier architecture in accordance with certain aspects of the present invention.

FIG. 3 is a schematic view of pump control electronics usable in the optical amplifier architecture shown in FIG. 2.

DETAILED DESCRIPTION

Figure 4:
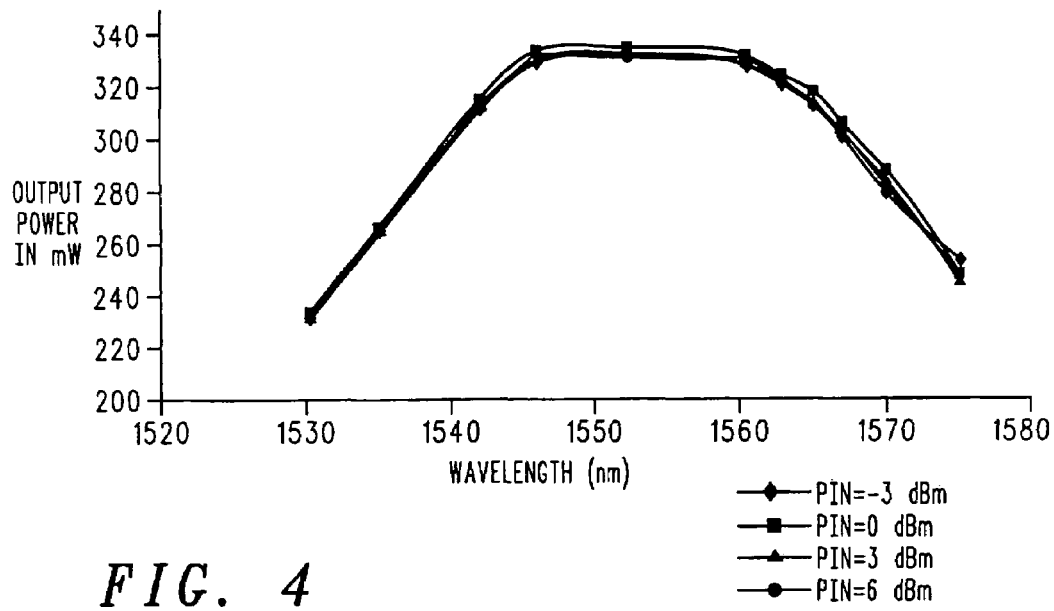
FIG. 4 graphically depicts experimental results of output power vs. wavelength for various optical signals input to the optical amplifier architecture shown in FIG. 2.

Turning now to the drawings, wherein like numerals designate like components, FIG. 2 illustrates an optical amplifier architecture 200 in accordance with certain aspects of the present invention. Amplifier architecture 200 includes an amplifier section 202 and an amplifier section 204, which are under common control (not shown). An optical coupler 206, which may be a 1×2 50/50 optical coupler, such couplers being well-known and widely available, is responsive to receive an optical input signal 208, and to split optical input signal 208 into a signal component 210, which is receivable by amplifier section 202, and a signal component 212, which is receivable by amplifier section 204. Optical input signal 208 may be a signal that is received directly from a passive optical network ("PON"), or may optionally be received from the output of a booster 205.

As shown, booster 205 includes a rare earth doped optical fiber 214, pumped optically by pump 16, which is coupled to a wave division multiplexer ("WDM") 18. The use of booster 205 further increases an output power 280 (discussed further below) over a predetermined wavelength range, and improves the noise figure (also discussed further below), of amplifier architecture 200.

Optical fiber 214 may be doped with erbium ions—an erbium-doped optical fiber is conventionally referred to as an "$ER^{+3}$" fiber, and an optical amplifier using an $ER^{+3}$ fiber is conventionally referred to as an erbium-doped fiber amplifier ("EDFA")—although optical fiber 214 may be doped with other rare earth ions, such as neodymium, praseodymium, ytterbium, or a combination thereof. Pump 216 provides additional gain to optical fiber 214. Pump 216 may be, for example, a laser diode or another type of fiber laser or device for imparting optical gain, such devices being well-known and widely available. WDM 218 couples wavelengths within a predetermined wavelength range, such as a range between 980 nanometers ("nm"), and 1550 nm, reducing optical energy supplied by pump 216 in the predetermined wavelength range. WDM 218 may be any suitable coupling device, such devices being well known and widely available. Booster 205 may be an integral part of, or a separate component from, amplifier architecture 200.

During operation, amplifier section 202 produces an optical power 230, by amplifying signal component 210 in rare earth doped optical fiber 220, using optical energy supplied by pumps 222 and 224, which are coupled to WDMs 226 and 228, respectively. Similarly, amplifier section 204 produces an optical power 250, by amplifying signal component 212 in rare earth doped optical fiber 240, using optical energy supplied by pumps 232 and 234, which are coupled to WDMs 236 and 238, respectively.

As shown, rare earth doped optical fibers 220 and 240 are $ER^{+3}$ fibers, but may be fibers doped with other rare earth ions. Pumps 222 and 232 supply optical energy to input sides of optical fibers 220 and 240, respectively, while pumps 224 and 234 supply optical energy to output sides of optical fibers 220 and 240, respectively (in a reverse direction relative to optical signals 210 and 212, respectively). Pumps 222, 224, 232, and 234 may be, for example, single-mode laser diodes or other types of fiber lasers or devices for imparting optical gain, such devices being well known and widely available. WDMs 226, 230, 236, and 238 couple optical energy from pumps 222, 224, 232, and 234, respectively, in a common wavelength range—as shown, a range between 1480 nm and 1550 nm. It will be appreciated, however, that other arrangements of pumps, WDMs, and wavelength ranges are possible.

Power splitters 260 and 270, which may be 1×4 power splitters or other types of power splitters, such components being well-known and widely available, receive optical powers 230 and 250. A sum of powers 230 and 250 provides a total output power 280.

If it is desirable to protect certain components—such as pumps 216, 222, 224, 232, and 234—from transient currents that may develop at higher powers, and/or to limit an amount of signal power launched into a particular length of optical fiber, certain electronics for temperature and optical power control may be employed. FIG. 3 is a schematic view of control electronics usable in conjunction with pumps 216, 222, 224, 232, or 234 (shown in FIG. 2) o adjust pump biases, resulting in the substantially uniform reduction of the various components of output power 280 and/or output ports thereof. FIG. 4 graphically depicts experimental results of output power (mW) vs. wavelength (nm) for various optical signals (dB) input to an optical amplifier having amplifier architecture 200, shown in FIG. 2. More specifically, the vertical axis of FIG. 3 depicts output power 230 or 250 of amplifier section 202 or 204, respectively, with the use of built-in booster 205 with a pump coupled to a WDM having a wavelength range of between about 980 nm–1550 nm. The optical amplifier is an EDFA, with single-mode pumps coupled to WDMs having wavelength ranges of between about 1480 nm–1550 nm. It can be seen that at an operating wavelength window of between about 1540 nm–1570 nm, the output power is at least about 300 mW.

Figure 5:
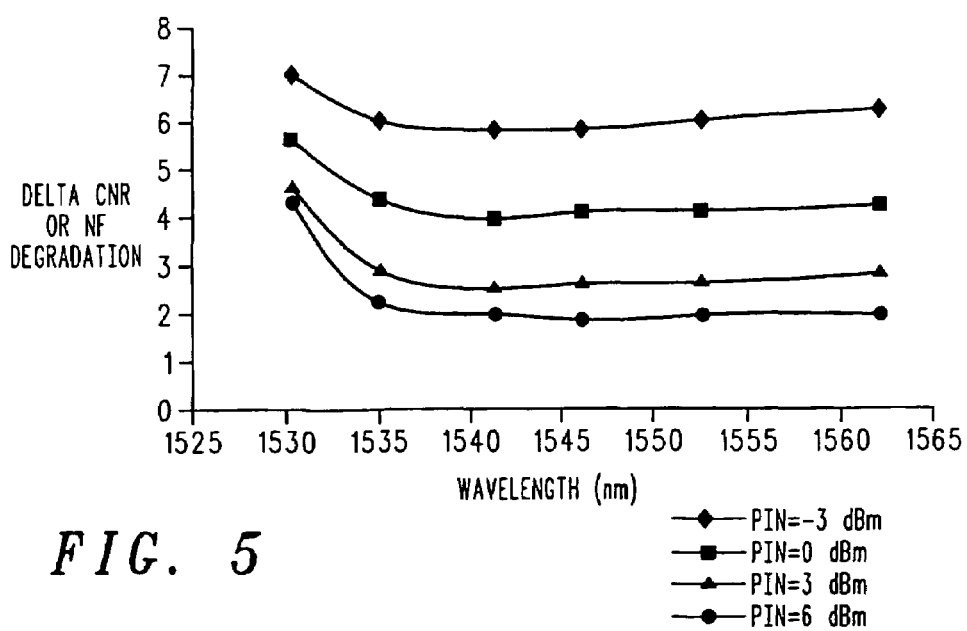
FIG. 5 graphically depicts experimental results of noise figure vs. wavelength for various optical signals input to the optical amplifier architecture shown in FIG. 2.

FIG. 5 graphically depicts experimental results of noise figure (CNR or NF) vs. wavelength (nm) for various optical signals (dB) input to the optical amplifier configured as set forth in connection with FIG. 3. It can be seen that, for a particular optical signal, the noise figure is substantially constant over a wavelength range of between about 1535 nm to over 1560 nm. To further improve noise figures (for example, to address bleed-through of certain wavelengths, such as 1480 nm, from pumps such as pumps 228 and/or 238, shown in FIG. 2), filter-based WDMs may be used.

Referring again to FIG. 2, it can be seen that using amplifier architecture 200, which features all optics within a single optical tree/component, the optional use of booster 205, and/or certain electronic pump controls or WDM filters, an overall output power 280 of at least about 600 mW, and up to about 900 m, is reliably achievable, and a wavelength band from approximately 1540 nm to 1560 nm can be amplified with a substantially similar amount of gain Because output power 280 does not all pass through a single path, special components with high power tolerances are not necessary. In addition, the number of output ports is configurable with minimum effort, and bifurcated power paths may operate independently, minimizing effects of component failures in any one path, and allowing individual sections of a network to be serviced/maintained independently.

Figure 6:
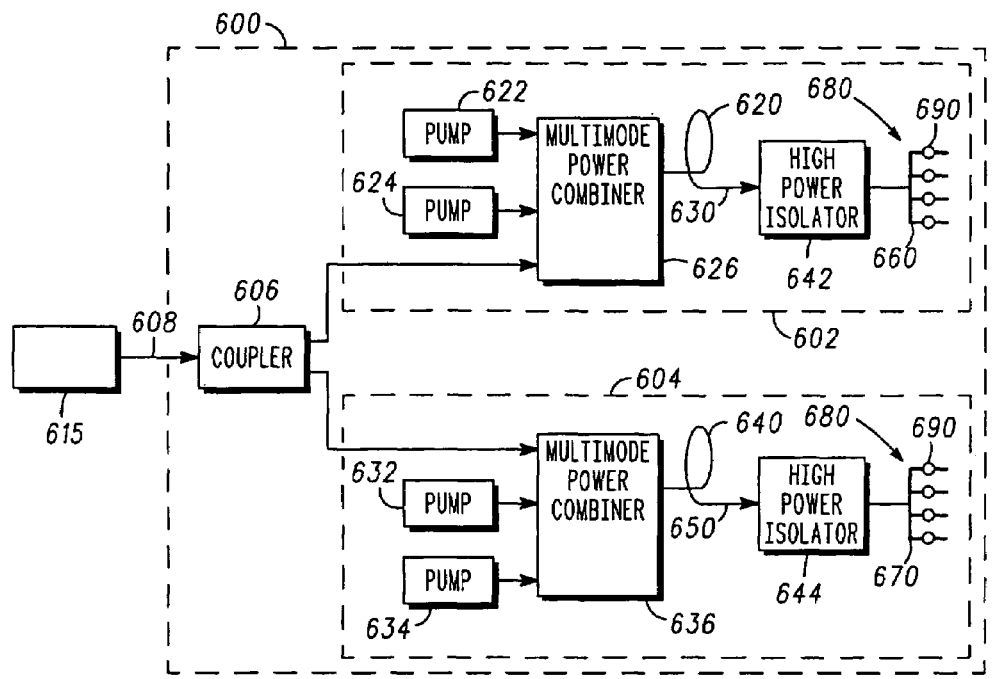
FIG. 6 illustrates an optical amplifier architecture in accordance with other aspects of the present invention.

FIG. 6 illustrates an optical amplifier architecture 600, in accordance with further aspects of the present invention, which is capable of producing an increased total output power 680 (discussed further below). Like optical amplifier architecture 200, amplifier architecture 600 includes an amplifier section 602 and an amplifier section 604, which are under common control (not shown). An optical coupler 606, which may be a 1×2 50/50 optical coupler, such couplers being well-known and widely available, is responsive to receive an optical input signal 608, and to split optical input signal 608 into a signal component 610, which is receivable by first section 602, and a signal component 612, which is receivable by second section 604.

Optical input signal 608 may be a signal that is received directly from a PON, or may optionally be received from the output of one or more boosters 615, which would include elements such as rare earth doped optical fiber 214, pump 216 and WDM device (not shown, shown in, described in connection with, FIG. 2). Booster 615 further increases output power 680 over a predetermined wavelength range, and improves the noise figure of amplifier architecture 600.

During operation, amplifier section 602 produces an optical power 630, by amplifying signal component 610 in rare earth doped optical fiber 620, using optical energy supplied by pumps 622 and 624, which are coupled to a multimode power combiner 626. Similarly, amplifier section 604 produces an optical power 650, by amplifying signal component 612 in rare earth doped optical fiber 640, using optical energy supplied by pumps 632 and 634, which are coupled to a multimode power combiner 636.

As shown, rare earth doped optical fibers 620 and 640 are double-clad erbium-ytterbium fiber spools, but may be fibers doped with other rare earth ions. Pumps 622 and 624 supply optical energy to the input side of optical fiber 620, while pumps 632 and 634 supply optical energy to the input side of optical fiber 640. Pumps 622, 624, 632, and 634 may be high-power multimode pumps, such pumps being well-known and widely available.

Figure 7:
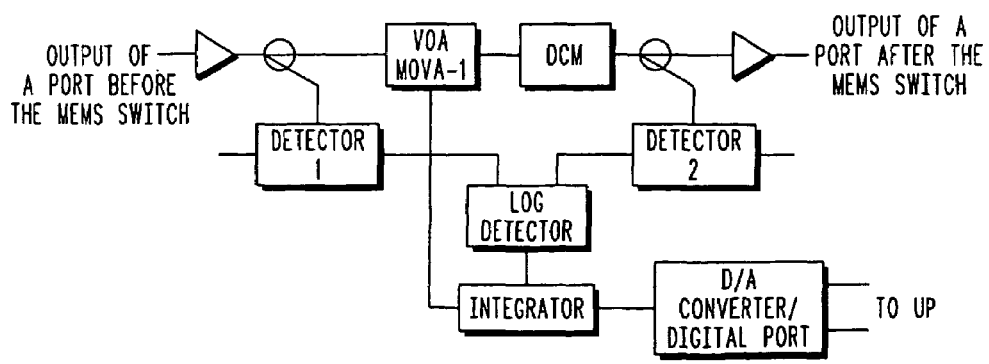
FIG. 7 is a block diagram of a MEMS switch control, usable in connection with the optical amplifier architecture shown in FIG. 6.

To improve the noise figure(s) of amplifier architecture 600, optical powers 630 and 650 produced by optical fibers 620 and 640, respectively, are fed into high-power isolators 642 and 644, respectively. High-power isolators are well-known and widely available components (for example, high-power WDMs). Power splitters 660 and 670 may be utilized to configure a number of output ports (eight are shown), and total output power 680 is at least about 1 W, and up to about 3 W. To further improve serviceability and safety, MEMS switches 690 may be located on the output ports, allowing the output ports to be switched off independently. A block diagram of a sample switch control for a MEMS switch 690 is shown in FIG. 7.

Although specific functional elements and arrangements thereof have been described herein, it is contemplated that the embodiments described herein may be implemented in a variety of ways. For example, functional elements may be packaged together or individually, or may be implemented by fewer, more, or different devices, and may be either integrated within other products, or be adapted to work with other products externally. When one element is indicated as being responsive to another element, the elements may directly or indirectly coupled. Connections depicted herein may be logical or physical in practice, to achieve a coupling or communicative interface between elements.

It will furthermore be apparent that other and further forms of the invention, and embodiments other than the specific embodiments described above, may be devised without departing from the spirit and scope of the appended claims.

The invention claimed is:

1. An optical amplifier for amplifying an optical input signal, comprising:

a first optical coupler configured to split the optical input signal into a plurality of optical signals;

a plurality of amplifier sections responsive to receive the plurality of optical signals, each amplifier section includes:

an optical fiber for generating an optical output power;

a first pump source; and a second pump source, the first and second pump sources configured to supply a first energy amount, in a common wavelength band, to the optical fiber, wherein each amplifier section of the plurality of amplifier sections is associated with an optical signal of the plurality of optical signals, and a total optical output power of the optical amplifier is at least about 600 mW.

2. The optical amplifier of claim 1, further including a plurality of power splitters, each power splitter of the plurality of power splitters being associated with one amplifier section.

3. The optical amplifier of claim 2, wherein at least one power splitter splits the optical output power n ways, n being at least 2.

4. The optical amplifier of claim 1, further including a booster for amplifying the optical input signal prior to being split by the first optical coupler.

5. The optical amplifier of claim 1, wherein each amplifier section of the plurality of amplifier sections operates independently of all other amplifier sections.

6. The optical amplifier of claim 1, wherein the optical fiber of at least one amplifier section is doped with erbium.

7. The optical amplifier of claim 1, wherein the first pump source of at least one amplifier section is arranged to supply energy to the first optical fiber in a forward direction relative to the first optical signal, and the second pump source is arranged to supply energy to the optical fiber in a reverse direction relative to the first optical signal.

8. The optical amplifier of claim 1, further comprising: at least one wave division multiplexer ("WDM") disposed in at least one amplifier section, responsive to supply the first energy amount to the optical fiber.

9. The optical amplifier of claim 1, wherein at least one of the first pump source or second pump source of at least one amplifier section includes a single-mode pump source.

10. The optical amplifier of claim 1, wherein at least one of the first pump source or the second pump source of at least one amplifier section have switched temperature and optical power control.

11. The optical amplifier of claim 1, wherein at least one of the first pump source or the second pump source of at least one amplifier section includes a multimode pump source.

12. The optical amplifier of claim 1, wherein the optical fiber of at least one amplifier section is doped with erbium and ytterbium.

13. The optical amplifier of claim 1, wherein at least one amplifier section of the plurality of amplifier sections include a multimode power combiner responsive to receive the first energy amount and to supply the first energy amount to the optical fiber.

14. The optical amplifier of claim 13, wherein the at least one amplifier section includes a first high-power isolator responsive to receive the optical output power.

15. A method of amplifying an optical signal comprising the step of:
splitting the optical input signal into a plurality of optical signals; and
providing the plurality of optical signals to a plurality of amplifier sections, each amplifier section including:
an optical fiber for generating an optical output power;
a first pump source; and
a second pump source, the first and second pump sources configured to supply a first energy amount, in a common wavelength band, to the optical fiber, wherein each amplifier section of the plurality of amplifier sections is associated with an optical signal of the plurality of optical signals, and a total optical output power of the optical amplifier is at least about 600 mW.

16. The method of claim 15, further splitting the optical output power of each optical fiber.

17. The method of claim 15, wherein the optical output power is split n ways, n being at least 2.

18. The method of claim 15, further including amplifying the optical input signal prior to being split into a plurality of optical signals.

19. The method of claim 15, wherein each amplifier section of the plurality of amplifier sections operates independently of all other amplifier sections.

20. The method of claim 15, wherein the optical fiber of at least one amplifier section is doped with erbium.

21. The method of claim 15, further comprising the step of supplying energy to the first optical fiber in a forward direction relative to the first optical signal from the first pump source of at least one amplifier section, and supplying energy to the optical fiber in a reverse direction relative to the first optical signal from the second pump source.

22. The method of claim 15, wherein at least one wave division multiplexer ("WDM") is disposed in at least one amplifier section, the method further comprising the step of supplying the first energy amount to the optical fiber from the WDM.

23. The method of claim 15, wherein at least one of the first pump source or second pump source of at least one amplifier section includes a single-mode pump source.

24. The method of claim 15, wherein at least one of the first pump source or the second pump source of at least one amplifier section have switched temperature and optical power control.

25. The method of claim 15, wherein at least one of the first pump source or the second pump source of at least one amplifier section includes a multimode pump source.

26. The method of claim 15, wherein the optical fiber of at least one amplifier section is doped with erbium and ytterbium.

27. The method of claim 15, wherein at least one amplifier section of the plurality of amplifier sections include a multimode power combiner, and the method further comprises the step of providing the first energy amount to the multimode power combiner, and supply the first energy amount from the multimode power combiner to the optical fiber.

28. The method of claim 27, further comprising providing the optical output power from at least one optical fiber to a high-power isolator.

* * * * *